(No Model.) 2 Sheets—Sheet 1.

W. E. BAXTER.
COOKING APPARATUS.

No. 584,259. Patented June 8, 1897.

WITNESSES:
Jos. A. Ryan
P. B. Turpin

INVENTOR
William E. Baxter.
BY Munn & Co.
ATTORNEYS.

(No Model.) 2 Sheets—Sheet 2.
W. E. BAXTER.
COOKING APPARATUS.
No. 584,259. Patented June 8, 1897.
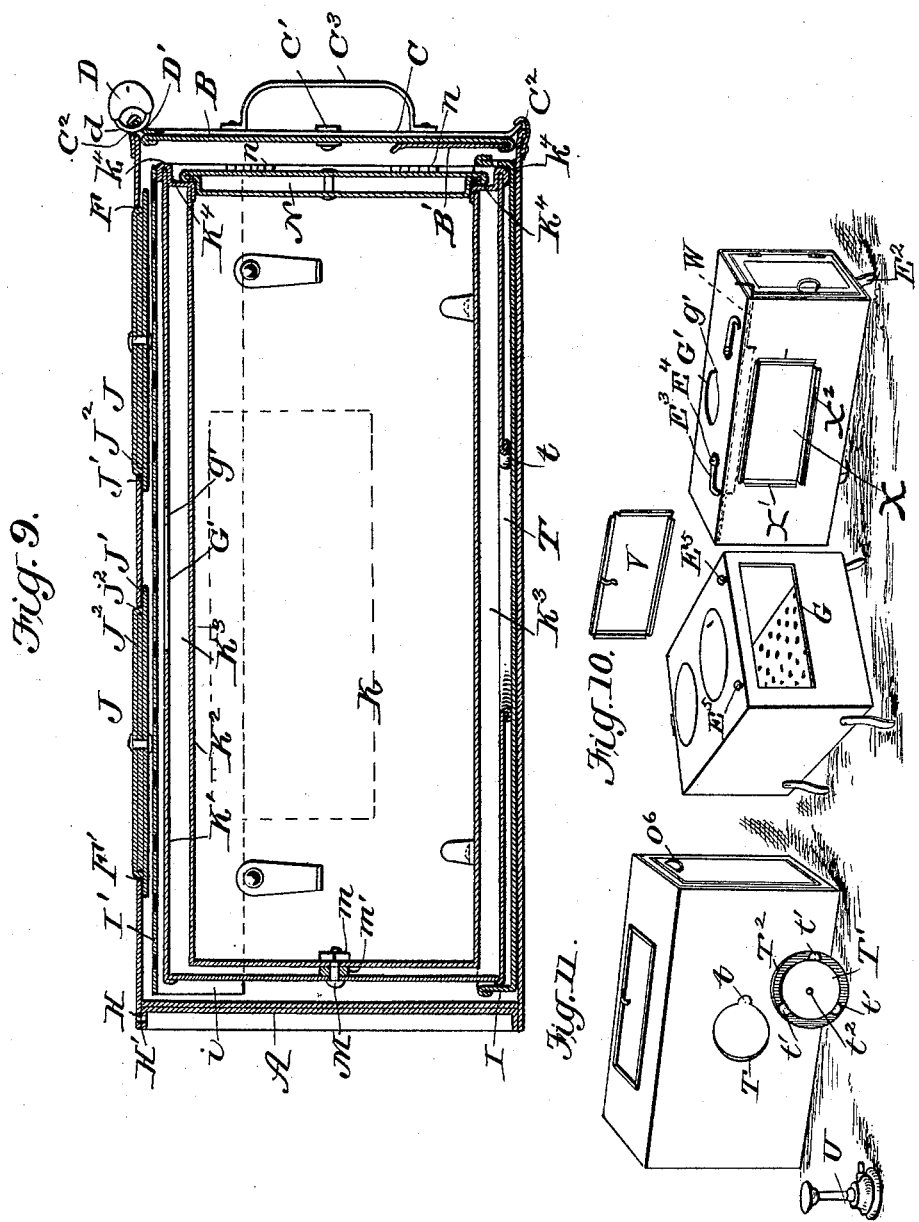
WITNESSES:
Jos. A. Ryan
P. B. Turpin
INVENTOR
William E. Baxter
BY Munn & Co
ATTORNEYS.

UNITED STATES PATENT OFFICE.

WILLIAM EDWARDS BAXTER, OF FRANKFORT, KENTUCKY.

COOKING APPARATUS.

SPECIFICATION forming part of Letters Patent No. 584,259, dated June 8, 1897.

Application filed June 22, 1896. Serial No. 596,465. (No model.)

*To all whom it may concern:*

Be it known that I, WILLIAM EDWARDS BAXTER, of Frankfort, in the county of Franklin and State of Kentucky, have invented a new and useful Improvement in Cooking Apparatus, of which the following is a specification.

My invention is an improvement in portable cooking apparatus, especially such as is intended for use in camping out, campaigning, and the like, and which can be conveniently and compactly packed in shape for storage or carrying; and the invention consists in certain novel constructions and combinations of parts, as will be hereinafter described, and pointed out in the claims.

Figure 1:
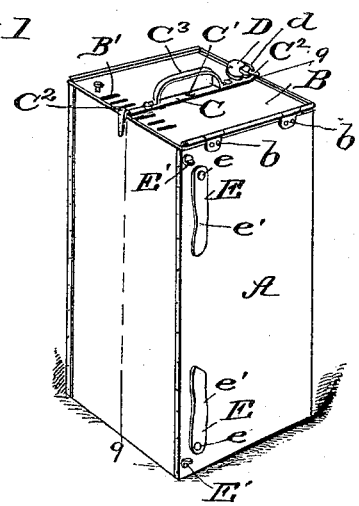
Figure 2:
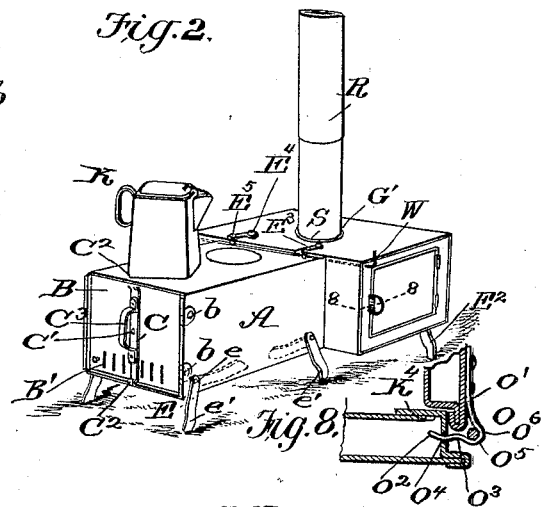
Figure 3:
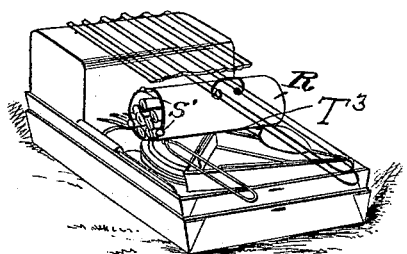
Figure 4:
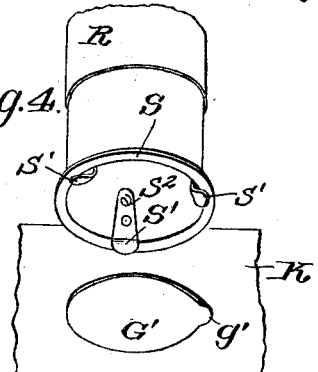
Figure 5:
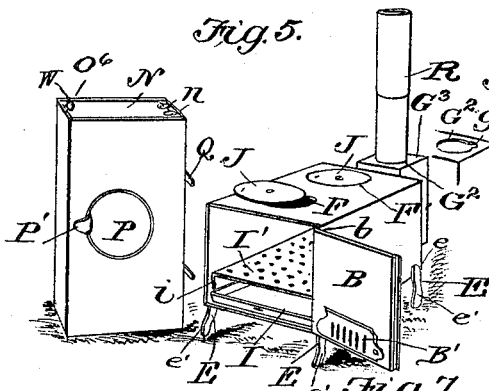
Figure 6:
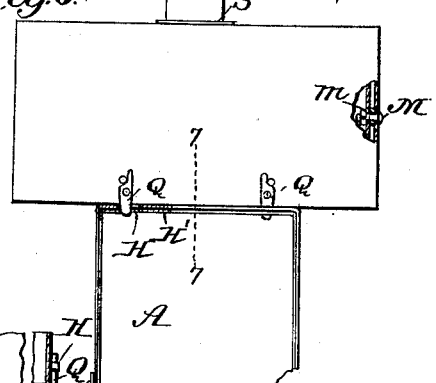

In the drawings, Figure 1 is a perspective view of the apparatus packed and ready for shipment or storage. Fig. 2 shows the apparatus ready for use, the oven being in place for baking. Fig. 3 is a perspective view of the so-called "duffle" packed ready to be inserted in the oven. Fig. 4 is a detail view showing the construction by which the stovepipe is secured in place. Fig. 5 is a perspective view showing the oven removed and the stovepipe applied directly to the stove, the latter being thus adapted for heating purposes alone or for cooking other than baking. Fig. 6 is a rear elevation of the stove and oven, the latter being adjusted in place upon the stove and parts being broken away and others shown in section. Fig. 7 is a detail section on about line 7 7, Fig. 6. Fig. 8 is a detail section on about line 8 8, Fig. 2. Fig. 9 is a longitudinal section on about line 9 9 of Fig. 1, the duffle being omitted. Fig. 10 is a perspective view of the stove and oven detached. Fig. 11 is a perspective view showing the under side of the oven, the cap-plate, and the burner.

The stove A is preferably made in the form of an elongated rectangular box, the sides and ends being suitably joined or united and the door B being hinged at $b$. To this door I pivot at C' the bolt C, whose ends turn into and out of engagement with the seats C² on the stove, such bolt having a central handle C³, by which it may be turned, and also by which the stove and parts stored therein may be conveniently carried. To hold the bolt in engagement with the seats, it is preferred to employ the lock D, whose shackle $d$ is passed through coincident openings D' in the bolt and seat, and when locked serves to hold the bolt securely in its seats. This not only serves to avoid any accidental release of the handle, but forms a lock by which the contents of the stove may be protected while in storage or transit and enables the shipment of the stove as freight or baggage in perfect security.

The door B has a damper B', which may preferably slide, as shown in Figs. 1, 2, and 5.

In use the stove is supported by the legs E, pivoted at $e$ to the sides of the stove and arranged to be turned up alongside the stove, as shown in Fig. 1, or down, as shown in Figs. 2 and 5, to serve as legs in supporting the stove for use. When turned down, as shown in Figs. 2 and 5, the legs bear against stops E', which may preferably be the turned-up edge of a rivet-disk, as shown in Fig. 1. To avoid any slipping of the legs when turned alongside the stove, I bend or deflect the legs E between their ends, as shown at $e'$ in Fig. 1, thus causing the free ends to bear with a tension against the sides of the stove and so prevent them from slipping or jarring out of turned-up position. The legs are not necessary and may be omitted, if desired.

In its top the stove has the lid-holes F and F', as shown in the detached view in Fig. 5. Near the rear end of the stove I provide slots or seats H H, formed in a flange-like extension H', projecting rearwardly at the upper edge of the stove, as shown in Fig. 7. These latter are only employed when the oven is to rest upon the stove, as presently described.

The ash-pan I fits in the bottom of the stove, and the perforated grate I' has the side flanges $i$, which fit alongside the pan and rest upon the bottom of the stove, as shown in Fig. 5. This grate performs an important function in storing the oven in the stove, as shown in Fig. 9 and as will be more fully described hereinafter. The lids J are preferably composed of a main plate J' and an inner cupped plate J², thus forming a simple, light, and economical lid which can be inverted and applied to the holes F F' from the inner sides of the stove, as shown in Fig. 9, in packing the apparatus.

The oven K is formed with an outer casing K' and an inner shell K², fitting in the outer casing and made sufficiently smaller than said casing to provide a space K³ between them, as shown in Fig. 9, for the draft, heat, and smoke to pass around the inner shell of oven. As is also shown in this figure, the inner shell has at its open end a flange-cap K⁴, fitting at k⁴ over the outer end of the casing K' and properly spacing the parts K' K² at the outer end of the oven. At their inner ends the parts K' K² are held together by a bolt M, nut m, and washer m'. By releasing this bolt M the shell K² can be quickly withdrawn to facilitate cleaning or for any other purposes desired. The oven-door N is hinged at n and is provided at its swinging edge with the spring-latch O, having a wing O', fixed to the door, a spring-wing O², deflected at O³ and arranged to engage in an opening O⁴ in the head-flange K⁴, and a looped portion O⁵ at the juncture of wings O' O² to receive the ring or other suitable hand-pull O⁶. The deflected spring-wing will in operation enter and bind in the opening O⁴ with sufficient tension to hold the door closed, and at the same time the door may be opened by a slight pull.

In its side the oven has an opening X, which registers with the hole G in the rear end of the stove when the oven is applied, as shown in Fig. 2, in which position the oven may be in part supported by the legs E², or such legs may be omitted. In securing the oven firmly to the stove I provide such oven with a hook or hooks E³, pivoted at E⁴ to the oven and having its hooked portion arranged to engage the headed stud or studs E⁵ in the stove, it being further held and braced by the flange X', more fully described hereinafter.

If desired, the oven may be fitted on the stove, as shown in Fig. 6, and to secure the oven when so arranged I provide on the rear side of such oven the pivoted strips Q, which may be turned down to form projections which enter the slots H in the stove, the hooked part P' engaging the front wall of hole F' and the parts Q operating to brace the oven firmly in position on the stove. The stove may have in its top a hole for the stovepipe, or such hole G² may be provided in a box G³, applied to the rear of the stove, as shown in Fig. 5. This hole G² has a slot or wing g for the lug on the stovepipe. In its top the oven has a stovepipe-hole G', having a slot or wing g', such parts G' and g corresponding to the parts G² g. However, if preferred, the top pipe-hole in the oven may be omitted and the oven be provided in its outer side with an opening to which the box G³ may be applied, as will be readily understood. The stovepipe R is applicable to either the oven, as shown in Fig. 2, or the box, as shown in Fig. 5, or to the top of stove, where a hole is made for same, and is preferably made in telescopic sections, so it can be conveniently packed.

At its lower end the stovepipe has flanges to fit above the casing in which the pipe-hole is formed, the lower flanges being movable through the notches in the pipe-holes.

In the construction shown, and as preferred, the upper flange S is annular and is formed by spreading the lower end of the stovepipe, while the lower flanges S' are in the nature of strips secured at S² within the stovepipe, extending below the same and bent outwardly-forming flange-like bearings which fit below the plate of the casing, whether it be the stove or oven. In applying the stovepipe it will be seen the flanged bearings S' may be inserted through the wing g' of the opening G' and then turned out of register with said wing and so secure the pipe in place. The oven may receive several pans, suitable supports therefor being provided, and the lid or lids of the stove support a coffee-pot or other boiler, as shown in Fig. 2, or the stove may be set, as shown in Fig. 5, when it will be found efficient as a tent or other heater or for cooking when no baking is desired. As shown in Fig. 2, it may also be used as a heater by throwing the damper open.

In packing the parts for storage the stovepipe should be removed and closed, the oven removed, and its pans taken out, such pans forming a receptacle for the duffle T³, as shown in Fig. 3, when such duffle can be inserted in the oven. The ash-pan I can then be fitted on one side of the oven, as shown in Fig. 9, and the grate I' fitted on the other side of such oven, the latter being the side to be placed next the stove-lid holes F F'. The lids being inverted and slipped in their holes from within the stove the oven, with pan and grate applied, can be inserted, as shown in Fig. 9. In this position the grate comes next the stove-lids and prevents any injury to the oven. The bolt can then be fastened and locked, the legs E turned up, and the whole is in compact form, as shown in Figs. 9 and 1.

In the under side of the outer shell of the oven I provide a hole T, corresponding to the pipe-hole in its top, and which hole may be closed, when desired, by a cap T', having lugs t', which may be inserted through slot or wing t, so the cap T' may be applied to close hole T, or this hole T may be left open to permit the use of a burner U (shown in Fig. 11) in which gas, gasolene, oil, or other similar fuel may be employed, in which case the hole in the side or sides of the oven, if the latter be used apart from the stove, may be closed by cap-plates V, (shown in Fig. 10,) and similar cap-plates may also be applied to the hole in the rear end of the stove when the pipe is used on top of the stove, or a box, as shown in Fig. 5, may fit the hole G in stove and be held in same manner as hook, flange X', and hooks E³ of oven make the fastening.

When the oven is applied to the stove, as shown in Fig. 2, three burners may be employed, two directly below the lids J J of the stove and one under the oven. A damper W is provided in the oven to control the passage of the heat, being made wide enough to close the space between the inner and outer shells. It is evident that the stove can be made to fit in the oven in the same manner that the oven is packed in the stove.

The oven has its opening X surrounded by a flange-like projection X', which enters the opening G in the stove and so completes the connection between the stove and oven. Manifestly this flange X' may be provided on the stove, if preferred.

The lower edge $X^2$ of the hole X is preferably turned down to form an elongated hook and hooks over the lower edge of hole G in end of stove, or vice versa. This keeps either end of oven from sagging.

As best shown in Fig. 11, the cap T' is composed of a main or outer plate and an inner plate $T^2$, riveted at $t^2$ to the main plate, and having the lugs $t'$, which may be slipped through the slot or wing $t$ in the hole T in applying the cap T', as will be understood from Fig. 11.

Having thus described my invention, what I claim as new, and desire to secure by Letters Patent, is—

1. In a cooking apparatus, substantially as described the combination of the plate having the hole provided with a notch and the pipe having lugs bearing beneath the plate and a flange bearing above the hole-plate and closing the notch therein substantially as shown and described.

2. The combination of the stove and oven fitting side by side and having coincident openings one of such parts having a tubular flange-like projection entering the opening in the other part substantially as shown and described.

3. The combination of the stove having an outlet-opening the oven fitting alongside said stove and having an opening coinciding with that of the stove and having the lower wall of said opening turned down forming a broad hook-like part engaging the stove, substantially as shown and described.

4. The cooking apparatus herein described comprising the stove, the oven adapted to be applied to said stove and having a notched stovepipe-hole and the stovepipe fitted to be applied to the hole of the oven or to stove when the latter is used alone, such pipe having at its lower end lugs bearing beneath the hole-plate and a continuous flange bearing above the hole-plate and closing the notch therein, substantially as shown and described.

5. The combination in a stove of the casing having bolt-seats, the door, the bolt pivoted to the door and turning into engagement with the seats and the lock securing the bolt to the seat substantially as shown and described.

6. The combination with the stove or casing of the legs pivoted thereto and bent whereby they may bear with tension against the casing when adjusted alongside the same substantially as shown and described.

7. The combination with a stove having a lid-hole, and provided in its top in rear of said hole with perforations, of the oven having in its under side a hole matching that of the stove and provided at the front end of said oven-hole with a hook to engage under the front wall of the lid-hole of the stove, and short bars pivoted to the rear side of the stove and turning down to enter the perforations in the top of the stove, substantially as shown and described.

8. The combination of the stove and oven having registered openings and a flange-like projection on one of said parts entering the other and having a hooked portion substantially as shown and described.

9. The combination of the door having at one end the inwardly-projected spring-latch bent substantially as described and the casing having a perforation receiving said latch the latter being adapted to operate substantially as and for the purposes set forth.

10. In an apparatus substantially as described the combination of the casing, the door and the latch consisting of a strip bent to form a wing fixed to the door, a spring-wing to engage the casing and an intermediate looped portion, and the hand-pull in said portion, substantially as shown and described.

11. In a cooking apparatus, the combination with the plate having a notched hole, of the cap composed of an outer or main plate fitted to cover the hole and the notch therein and an inner plate held to said upper plate and having lugs extended from its edge and arranged to move through the notch in the hole-plate and bear beneath said plate all substantially as shown and described.

WILLIAM EDWARDS BAXTER.

Witnesses:
JNO. A. BRISLAU,
GRANT GREER.